(12) United States Patent
Cai et al.

(10) Patent No.: US 8,843,980 B1
(45) Date of Patent: Sep. 23, 2014

(54) NETWORK-BASED VIDEO SOURCE AUTHENTICATION

(75) Inventors: Zheng Cai, Fairfax, VA (US); Arun Manroa, Herndon, VA (US); Yaojun Sun, South Riding, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1899 days.

(21) Appl. No.: 12/014,915

(22) Filed: Jan. 16, 2008

(51) Int. Cl.
*H04N 7/16* (2011.01)
*H04N 7/173* (2011.01)

(52) U.S. Cl.
USPC ............. 725/105; 725/62; 725/106; 725/120; 725/121; 725/122; 725/123

(58) Field of Classification Search
USPC ............... 725/25, 30, 62, 112, 105, 106, 120, 725/121, 122, 123
See application file for complete search history.

(56) References Cited

U.S. PATENT DOCUMENTS

| | | | | |
|---|---|---|---|---|
| 5,812,185 A * | 9/1998 | Mizuno et al. | ............. | 348/14.13 |
| 7,792,256 B1 * | 9/2010 | Arledge et al. | .......... | 379/102.01 |
| 2002/0056123 A1 * | 5/2002 | Liwerant et al. | ................ | 725/87 |
| 2004/0184528 A1 * | 9/2004 | Miyasaka et al. | ........ | 375/240.01 |
| 2004/0246376 A1 * | 12/2004 | Sekiguchi et al. | ............ | 348/468 |
| 2006/0242245 A1 * | 10/2006 | Christensen | .................. | 709/206 |

\* cited by examiner

*Primary Examiner* — Pankaj Kumar
*Assistant Examiner* — Alazar Tilahun

(57) ABSTRACT

A method is provided for authenticating a source device transmitting a video segment. In the method, the video segment is received from the source device over a communication network. The video segment comprises a number of frames. Identification data indicating the source device is also received over the communication network. Each of the frames of the video segment is marked with a form of the identification data. Access information is transmitted over the communication network for accessing the marked video segment.

20 Claims, 8 Drawing Sheets

NETWORK-BASED VIDEO SOURCE AUTHENTICATION

TECHNICAL BACKGROUND

With the advent of cellular telephones and other portable devices capable of capturing live events to a video segment or "clip," anyone possessing such a device may be in a position to record an emergent event of local or national interest if that person has line-of-sight to the event. Given the wide availability and general omnipresence of such devices, a person possessing such a device is oftentimes among the first to witness such an event, and is thus able to capture early portions of the event that are typically unavailable to a local or national media outlet, such as a local television station or a national news network. Such an outlet is typically at a disadvantage compared to persons carrying video-capable devices due to the limited number of reporters, video cameras, and the like at the disposal of the outlet, the distance often required to travel to the event, and other factors. As a result, media outlets are often interested in obtaining and broadcasting video segments of such events that have been captured by a private citizen. Moreover, these media outlets often rely on such video segments to supplement their news coverage.

OVERVIEW

Discussed herein is a method for authenticating a source device transmitting a video segment, wherein the video segment includes a number of frames. In the method, the video segment is received from the source device over a communication network. Also received over the communication network is identification data indicating the source device. Each of the frames of the video segment is marked with a form of the identification data. Access information is then transmitted over the communication network for accessing the marked video segment. The method may also be embodied as software encoded on a computer-readable medium.

Also provided is a communication node that includes a storage device and control logic. The storage device is configured to receive and store a video segment transmitted from a source device over a communication network, wherein the video segment include frames. The control logic is coupled with the storage device and is configured to receive identification data for the source device over the communication network. The control logic is also configured to mark each of the frames of the video segment in the storage device with a form of the identification data, and to transmit access information over the communication network for accessing the marked video segment.

DETAILED DESCRIPTION

Figure 1:
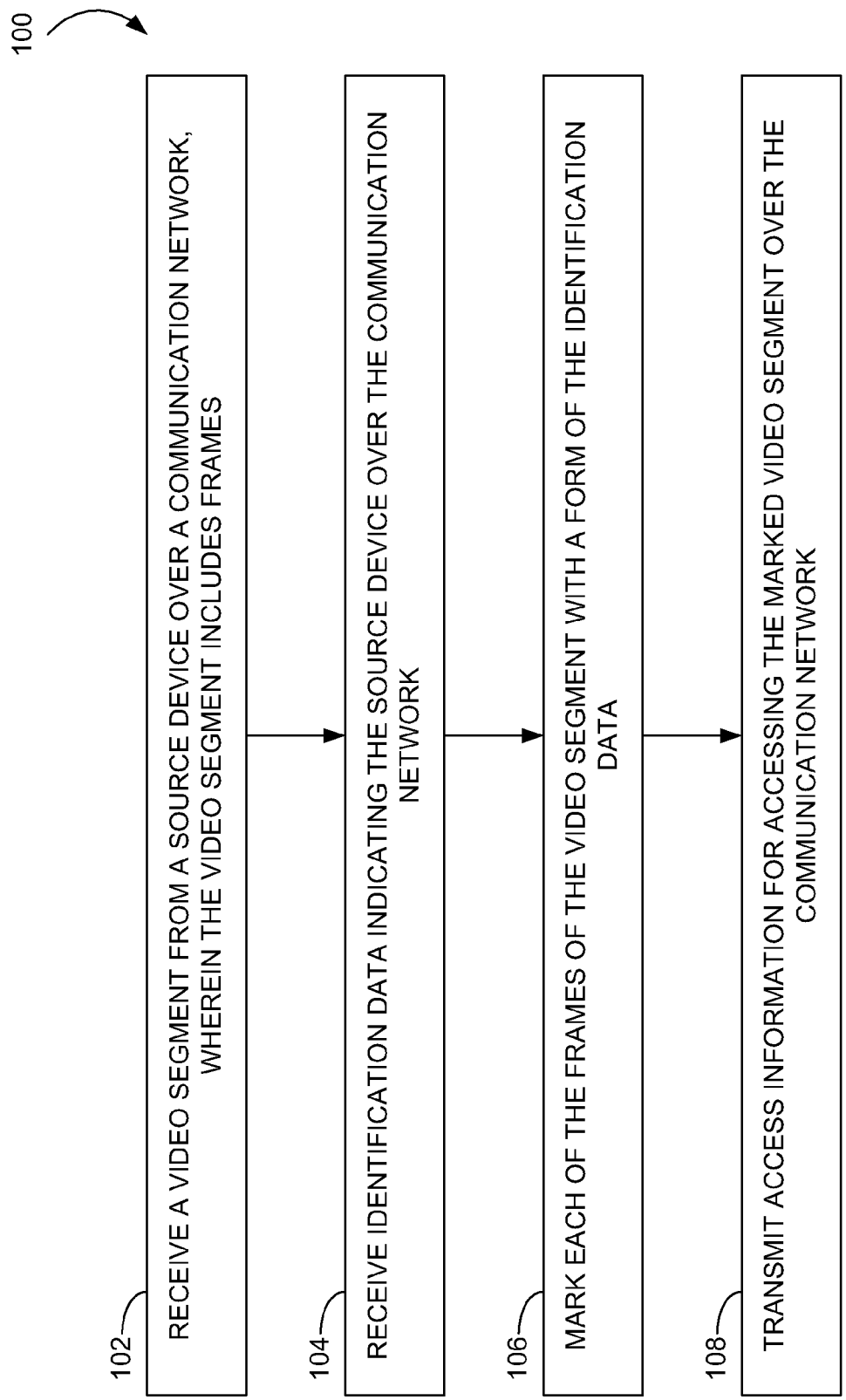
FIG. 1 is a flow diagram illustrating a method according to an embodiment of the invention for authenticating a source device transmitting a video segment.

FIG. 1 provides a flow diagram of a method 100 according to an embodiment of the invention for authenticating a source device transmitting a video segment, wherein the video segment includes a number of frames. In the method 100, a video segment is received from a source device over a communication network (operation 102). Also received over the communication network is identification data indicating the source device (operation 104). Each of the frames of the video segment is marked with a form of the identification data (operation 106). Access information for accessing the marked video segment is transmitted over the communication network (operation 108). While the operations 102-106 of FIG. 1 are displayed in a specific order, other orders of execution for the various operations, including concurrent execution of one or more operations, may be possible while remaining within the scope of the invention.

Figure 2:
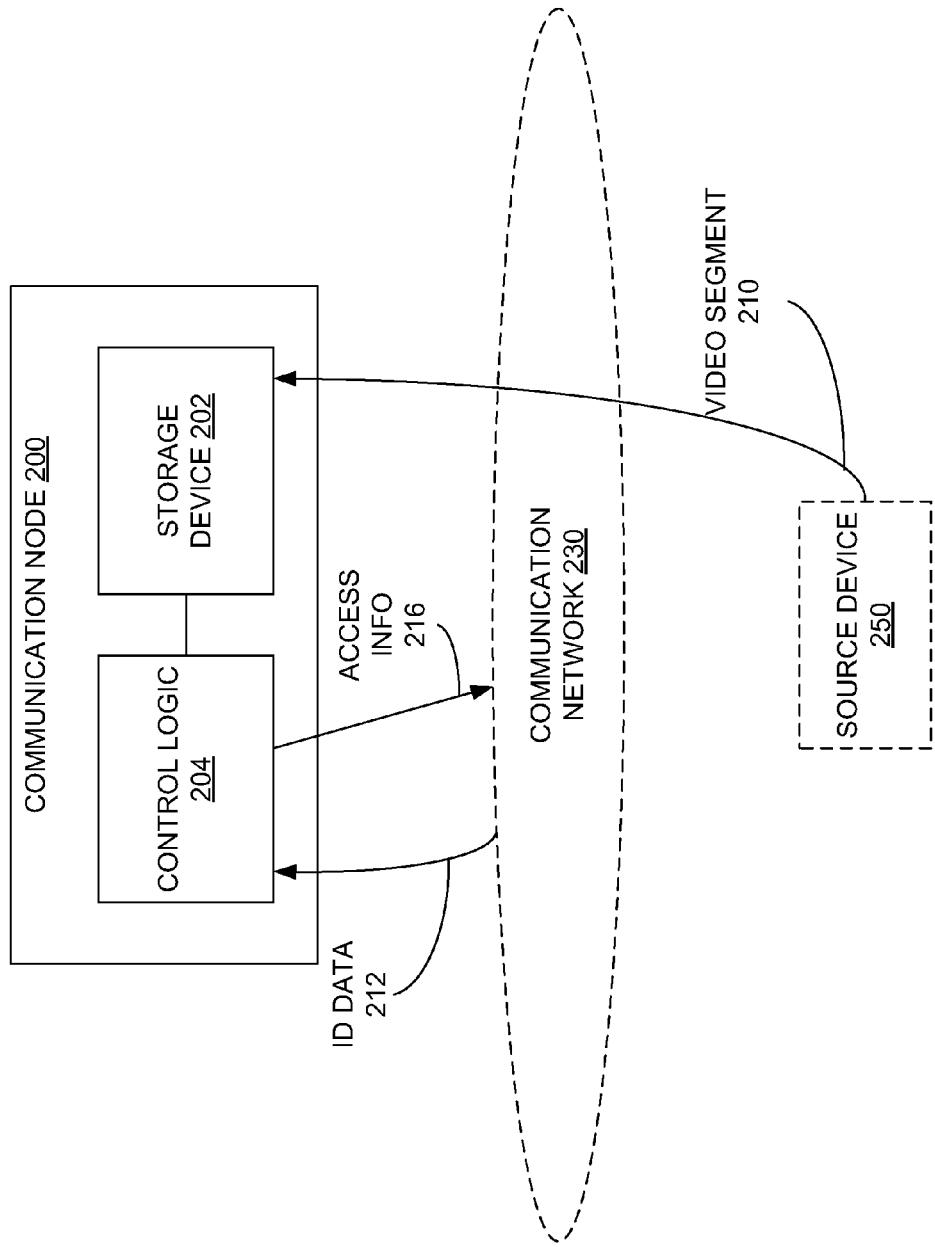
FIG. 2 is a block diagram of a communication node according to an embodiment of the invention.

FIG. 2 provides another example embodiment: a communication node 200 that includes a storage device 202 coupled with control logic 204. The storage device 202 is configured to receive and store a video segment 210 transmitted from a source device 250 over a communication network 230. The video segment 210 includes a number of frames. The control logic 204 is configured to receive identification data 212 for the source device 250 over the communication network 230, and to mark each of the frames of the video segment 210 in the storage device 202 with a form of the identification data 212. In addition, the control logic 204 is configured to transmit access information 216 over the communication network 230 for accessing the marked video segment.

Figure 3:
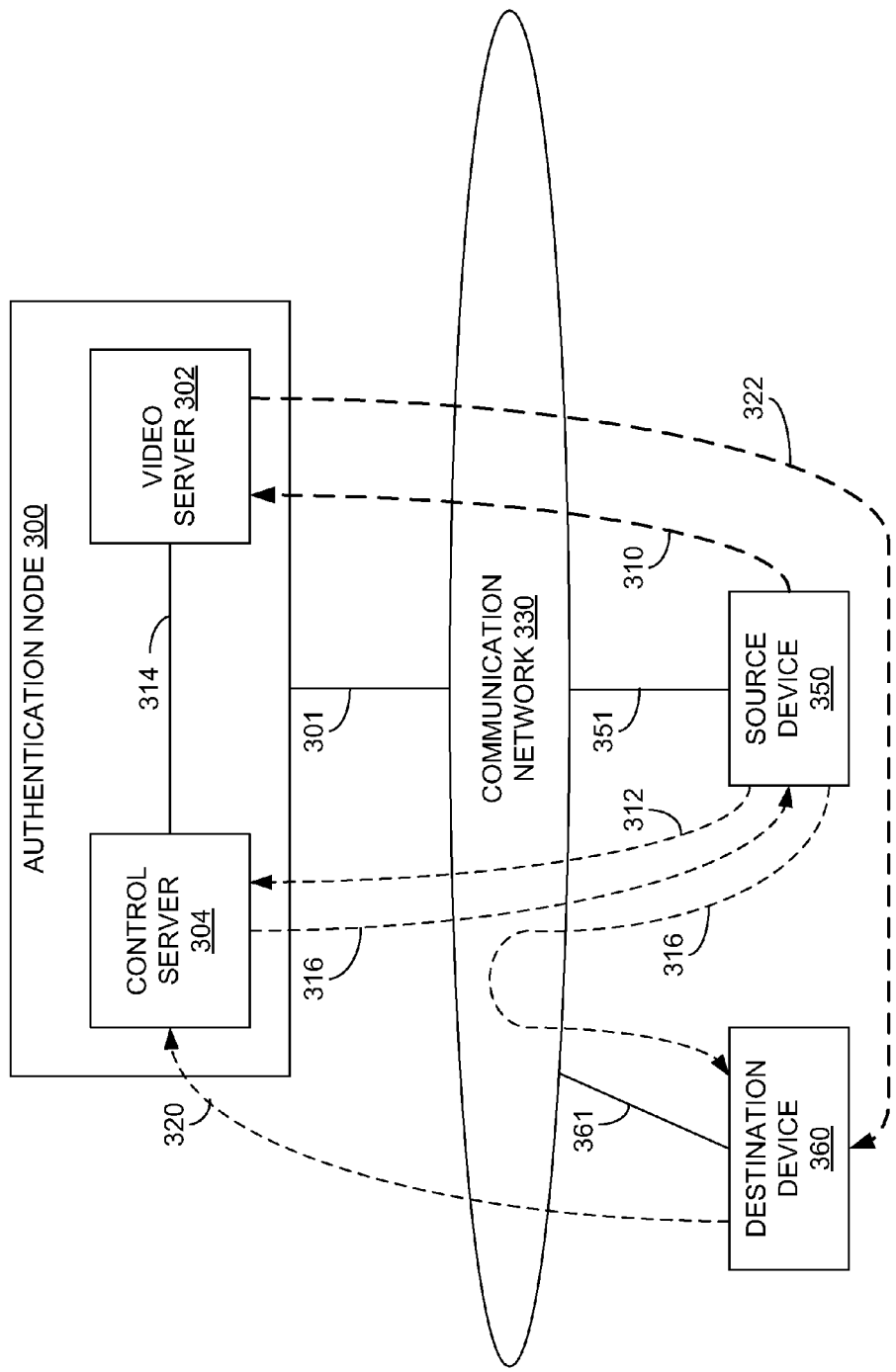
FIG. 3 is a block diagram of a communication node according to another embodiment of the invention.

In another embodiment depicted in FIG. 3, a communication node referred to as an authentication node 300 is employed to authenticate one or more video segments 310 received from devices capable of transmitting such video segments 310. The authentication node 300 includes a video server 302 and a control server 304. A communication path 314 couples the video server 302 and the control server 304. The video server 302 and the control server 304 may, for example, reside within the same enclosure, within separate enclosures at the same building or facility, or within separate enclosures at geographically distinct facilities. Depending upon the implementation, the communication path 314 may be a simple point-to-point connection, a local area network (LAN), a wide area network (WAN) such as the Internet, or another communication network. In another example, the video server 302 and the control server 304 may constitute different hardware or software portions of the same system, wherein the communication path 314 may be a hardware or software communication link.

Figure 4:
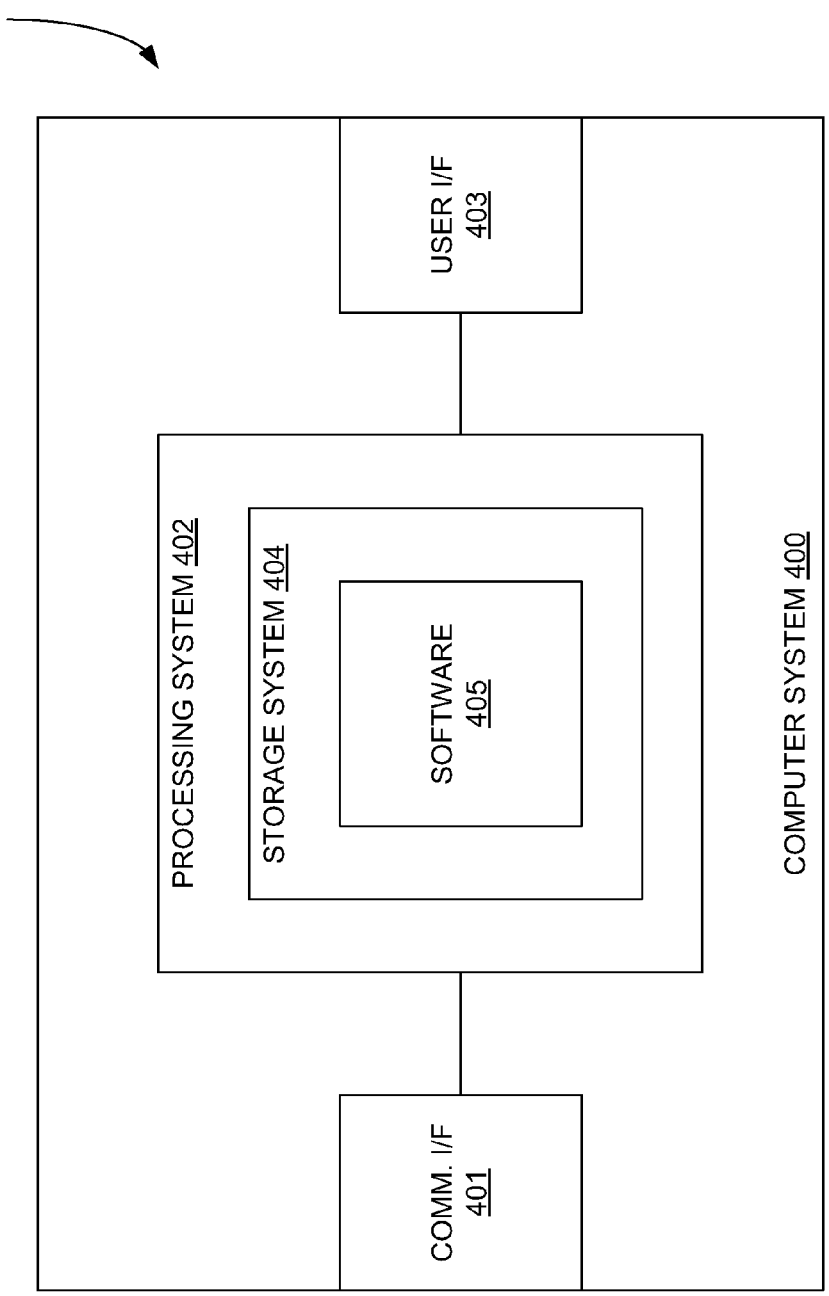
FIG. 4 is a block diagram of a computer system incorporated into the communication node of FIG. 3 according to an embodiment of the invention.

Further, the video server 302 and the control server 304, either separately or in combination, may be a computer system 400, as depicted in FIG. 4. In one example, the computer system 400 includes a communication interface 401, a processing system 402, and a user interface 403. The processing system 402 includes a storage system 404. The storage system 404 stores software 405. The processing system 402 is linked to the communication interface 401 and the user interface 403. The computer system 400 could include a programmed general-purpose computer, although those skilled in the art will appreciate that programmable or special purpose circuitry and equipment may be used. The computer system 400 may be distributed among multiple devices that together constitute elements 401-405.

More specifically, the communication interface 401 could include a network interface, modem, port, transceiver, or some other communication device. The communication interface 401 may be coupled with the network connection 301 (shown in FIG. 3), the communication path 314 coupling the video server 302 and the control server 304, or both. The communication interface 401 may be distributed among multiple communication devices. The processing system 402 could include a computer microprocessor, logic circuit, or some other processing device. Also, the processing system 402 may be distributed among multiple processing devices. The user interface 403 could include a keyboard, mouse, voice recognition interface, microphone and speakers, graphical display, touch screen, or some other type of user device. The user interface 403 may be distributed among multiple user devices. The storage system 404 could include a disk, tape, integrated circuit, server, or some other memory device, and may store video segments, identification data, and other information described in greater detail below. The storage system 404 may be distributed among multiple memory devices.

The processing system 402 retrieves and executes the software 405 from the storage system 404. The software 405 may include an operating system, utilities, drivers, networking software, and other software typically loaded onto a computer system. The software 405 could include an application program, firmware, or some other form of machine-readable processing instructions. When executed by the processing system 402, the software 405 may direct the processing system 402 to operate as described below.

Returning to FIG. 3, the video server 302 and the control server 304 may be coupled to a communication network 330, such as by way of a shared network connection 301 or separate network connections 301. The communication network 330 may include a WAN, such as the Internet, a LAN, or another network capable of transferring data, including video data. The communication network 330 may also include one or more wired and/or wireless communication networks, such as a cellular telephone network, a public switched telephone network (PSTN), and the like. The communication network 330 may include switches, routers, and other network nodes and devices not specifically noted in FIG. 3.

Also shown in FIG. 3 is a source device 350 coupled with the communication network 330 over a network connection 351. The source device 350 is configured to transfer one or more video segments 310 over the communication network 330. In one embodiment, the source device 350 is a cellular phone, personal digital assistant (PDA), camera, camcorder, or other portable device capable of capturing live action as a video segment by way of a charge-coupled device (CCD) array or other imaging component and associated electronic circuitry, and then transferring the video segment 310 over the communication network 330. Such a device 350 may transfer video wirelessly via a base transceiver stations (BTS) or other wireless communication system of the communication network 330. The source device 350 may also transfer the video segment 310 through the communication network 330 via a wired connection.

Figure 5:
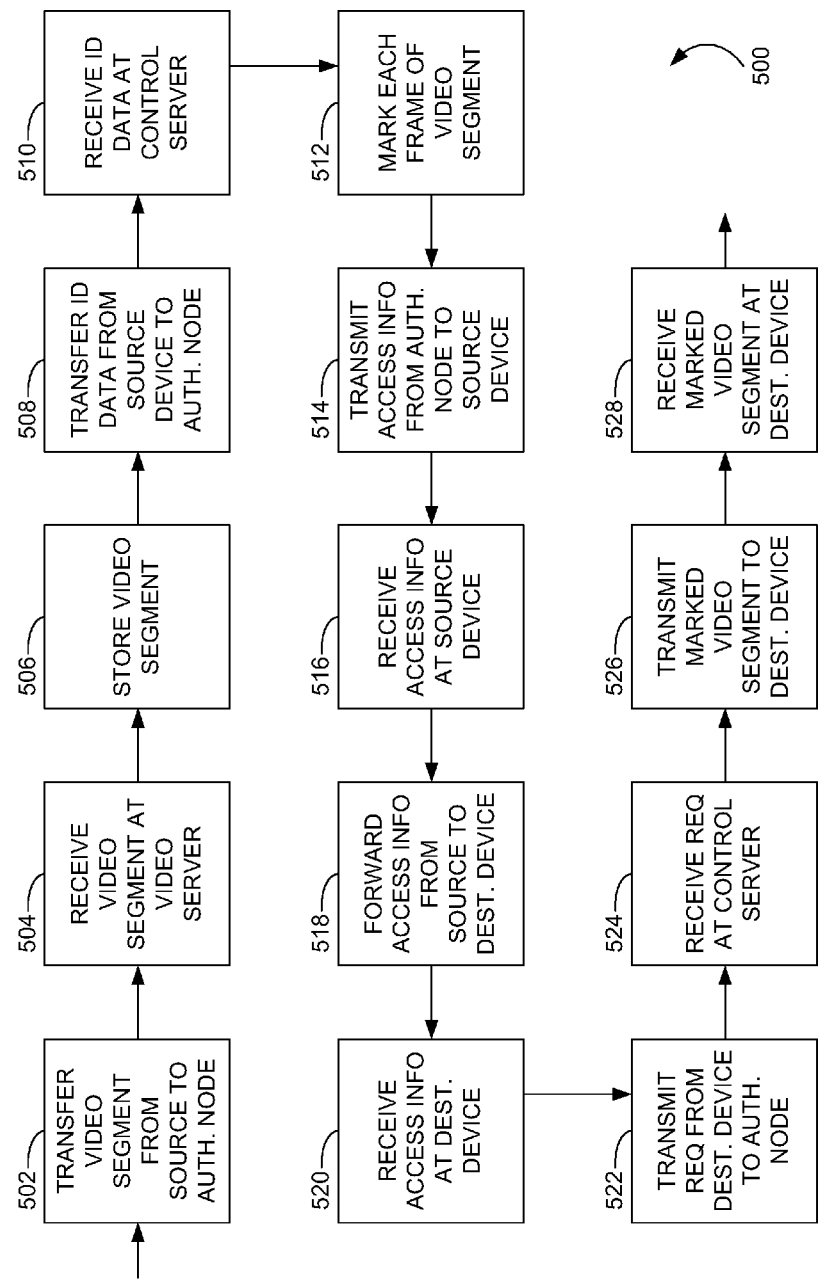
FIG. 5 is a flow diagram of a method according to another embodiment of the invention for authenticating a source device transmitting a video segment.

In conjunction with the transfer of the video segment 310 from the source device 350 over the communication network 330, FIG. 5 presents a flow diagram of a method 500 for authenticating the source device 350 providing the video segment 310. Below, the method 500 is described in terms of the operation of the authentication node 300 of FIG. 3, although the method 500 may also be performed employing varying devices and structures. Also, as with FIG. 1, while the operations of the method 500 are displayed as being executed in a specific order, other orders of execution, including concurrent execution of one or more of the operations, is also possible while remaining within the scope of the invention.

In the method 500, the source device 350 transfers the video segment 310 over the communication network 330 to the authentication node 300 (operation 502). In one embodiment, the video segment 310 is also captured or generated by the source device 350 before being transferred over the network 330. In another implementation, the source device 350 receives the video segment 310 from another device prior to transferring the video segment 310 over the network 330.

Figure 6A:
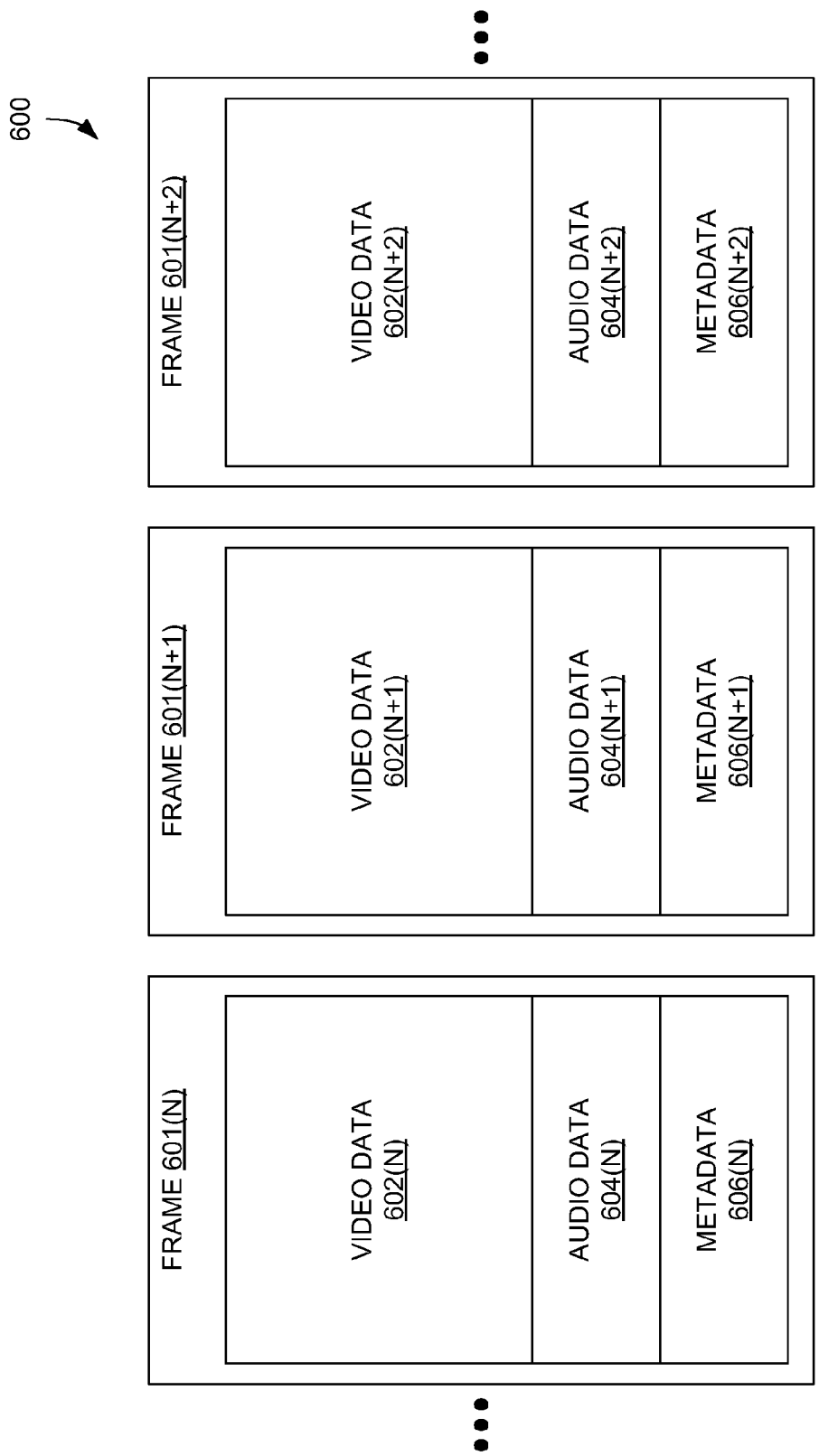
FIG. 6A is a block diagram illustrating a series of frames for a video segment prior to marking the frames according to an embodiment of the invention.

FIG. 6A provides a conceptual block diagram of a video segment 600 comprising a series of video frames 601 labeled 601(N), 601(N+1), 601(N+2), and so on. Each of the video frames 601 may include video data 602, audio data 604, and metadata 606. The metadata 606 may include, for example, data relating to a day, a date, and/or a time the video segment 610 was captured or generated, along with other data not included in the video data 602 and the audio data 604. In one implementation, the video data 602 may be formatted as defined by one of the standards produced by the Motion Picture Experts Group (MPEG), such as MPEG-2 or MPEG-4. Thus, each frame 601 of the video segment 600 may be, for example, an I-frame, P-frame, or B-frame, as discussed in that standard. The frames of the video segment 310 of FIG. 3 may be formatted in the fashion shown in FIG. 6A. Other video formats employing a series of frames may be employed in alternative implementations of the video segment 310 of FIG. 3.

The video segment 310 may be organized as a video file to be transferred as a number of packets for transmission over a data packet connection, such as an IP connection. In one embodiment, the video segment 310 may be uploaded by way of a World Wide Web uniform resource locator (URL), a file transfer protocol (FTP) site, an attachment to a message sent to an e-mail address, or other means available for transferring a video segment over the communication network 330 to a destination. Further, the destination for the video segment 310 from the standpoint of the source device 350 may be the video server 302 or the authentication node 300, depending on how these devices are addressed over the communication network 330.

Continuing with the method 500, in response to the transfer of the video segment 310 (operation 502), the video server 302 receives the video segment 310 via the network connection 301 (operation 504) and stores the video segment 310 (operation 506) in a storage medium incorporated within or coupled with the video server 302.

The video source 350 also transfers identification data 312 over the communication network 330 to the authentication node 300 (operation 508). In response, the control server 304 receives the identification data 312 (operation 510). The identification data 312 may be any data that identifies or is otherwise associated with the source device 350. For example, the identification data 312 may be a telephone number of the source device 350, such as in the case the source device 350 is a cellular phone. In another implementation, the identification data 312 may be a phone number of a user of the source device 350, a serial number of the source device 350, a name or number associated with the user of the source device 350, or other data that may be specifically or verifiably related to the source device 350.

In one embodiment, the user of the source device 350 may manually enter the identification data 312 into a field provided on a website used to upload the video segment 310 to the authentication node 300, incorporate the identification data 312 in an e-mail message, or relay the data 312 to the authentication node 300 using another method.

In yet another implementation, the source device 350 may automate the transfer of the identification data 312 over the communication network 330 by transferring the identification data 312 previously stored on the source device 350 over the network 330 along with the video segment 310. A software utility downloaded to the source device 350, possibly from the authentication node 300, and thereafter executed by the source device 350, may facilitate this automated functionality.

In another embodiment, instead of the source device 350 transferring the identification data 312 over the communication network 330 to the authentication node 300, the communication network 330 may instead be responsible for sourcing or asserting the identification data 312 to the authentication node 300. For example, the communication network 330 may have previously authenticated and/or authorized the source device 350 to engage in communications over the communication network 330, such as when the source device 350 initially connects to the communication network 330 to transfer the video segment 310 to the authentication node 300. Such authentication or authorization may occur as a result of one or more tokens or other forms of identification being received from the source device 350. The communication network 330 may then transfer one or more of these tokens or other forms of identification, or some variant thereof, to the authentication node 300. In one example, the communication network 330 may transfer the identification data 312 to the authentication node 300 in response to the source device 350 transferring the video segment 310 over the communication network 330 to the authentication node 300.

After the receiving the video segment 310 and the identification data 312, the authentication node 300, by way of the action of the control server 304, marks each of the frames of the video segment 310 with a form or version of the identification data 312 (operation 512). The form of the identification data 312 may be the identification data 312 without modification. In another example, the form of the identification data 312 may be the original identification data 312 encoded or translated using a predetermined algorithm to protect the identity of the source device 350 or user associated with the identification data 312, as well as to help prevent unauthorized modification of the identification data 312. Such a version of the identification data 312 may take the form of a digital signature in some implementations. According to another embodiment, the identification data 312 may be the result of a hashing function or operation to reduce the size of the identification data 312 that marks each frame of the video segment 310.

Each frame of the video segment 310 may also be marked with sequence data, such as a sequence number, indicating the sequential order of the frames as originally recorded. Thus, the sequence data may vary for each of the frames marked. The sequence data may be incorporated with or appended to the form of the identification data 312 used to mark each of the frames of the video segment 310. In one implementation, the sequence data indicates the frame sequence of the original video segment 310 so that any alterations to the video segment 310 after being marked may be detected. Further, the sequence data may be encoded in some fashion to help prevent tampering of the sequence data.

Figure 6B:
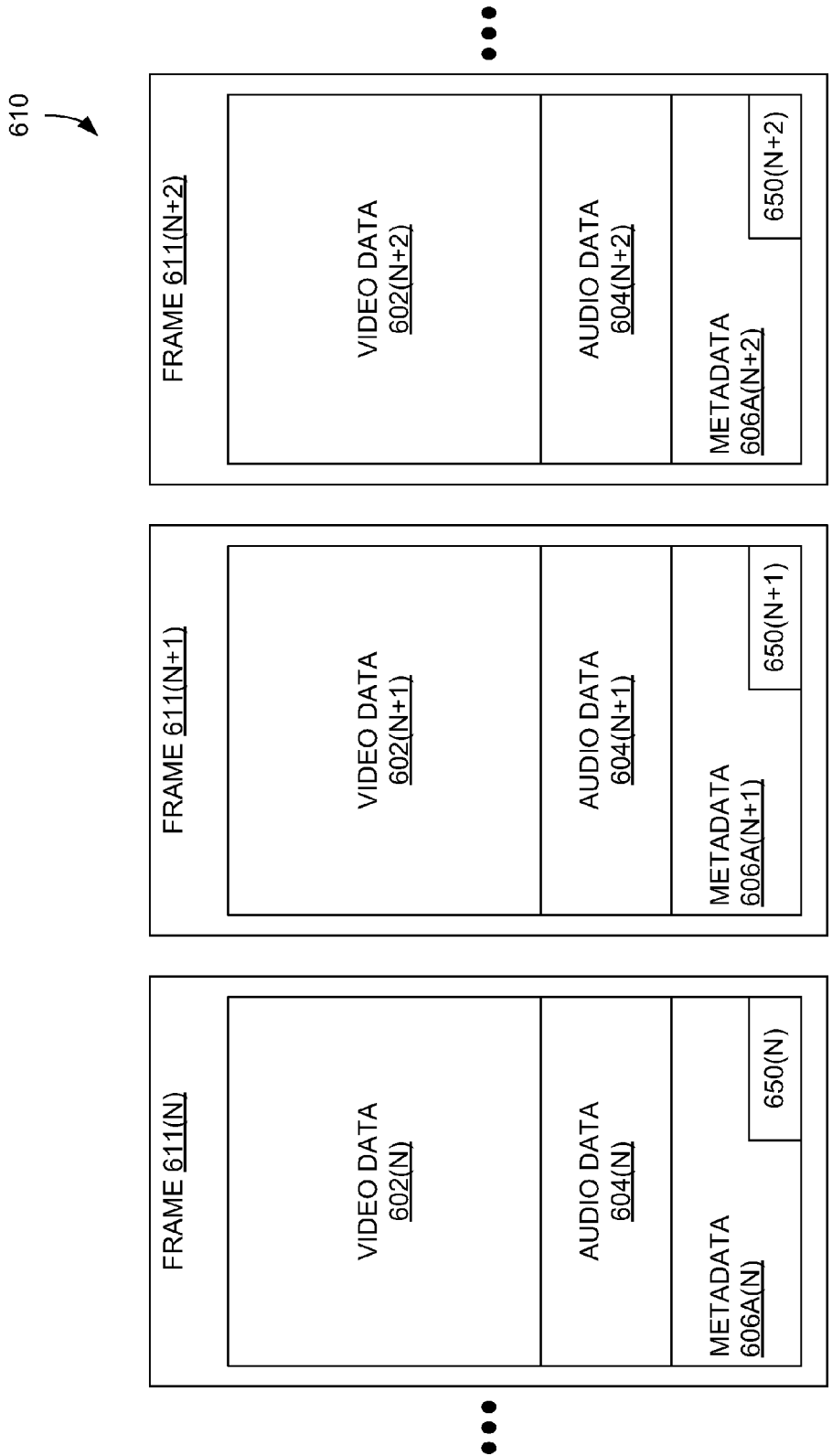
FIG. 6B is a block diagram illustrating a series of frames for a video segment subsequent to marking the frames according to an embodiment of the invention.

FIG. 6B provides an example of a marked video segment 610 including frames 611(N), 611(N+1), and 611(N+2). Each of the frames 611 includes a form 650 of the identification data 312, which possibly includes the sequence data described above. The form 650 of the identification data 312 is inserted into, or otherwise integrated with, the metadata 606A of the frame 611. For example, the form 650 of the identification data 312 may be stored in a previously unused field of the metadata 606A, may be appended to the metadata 606A, or may otherwise be associated with the metadata 606A of each of the frames 611.

Figure 6C:
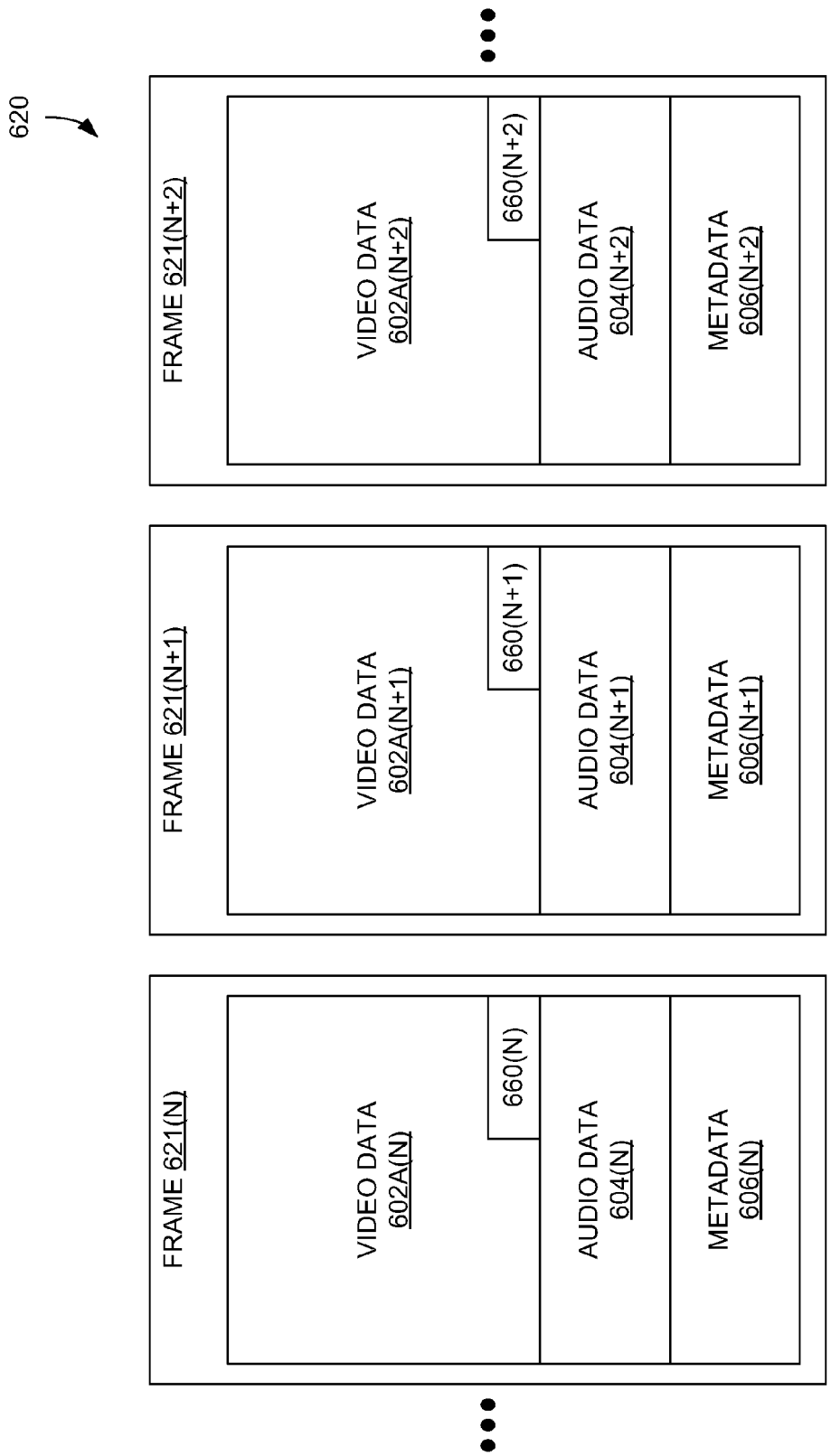
FIG. 6C is a block diagram illustrating a series of frames for a video segment subsequent to marking the frames according to another embodiment of the invention.

In another example, FIG. 6C displays an example of a marked video segment 620 composed of multiple frames 621(N), 621(N+1), 621(N+2), wherein a form 660 of the identification data 312 is inserted into the video data 602A of each of the frames 621. In one implementation, the form 660 of the identification data 312 may appear as a symbolic or textual representation of the form 660 of the identification data 312 displayed along with the video data 602A, possibly located along one of the edges of the image of each of the frames 621.

In other examples, the frames of the received video segment 310 may be marked with a form of the identification data 312 in other ways, such as by incorporating a version of the identification data 312 into the audio data 604 of each frame, appending the form of the data 312 to the end of the frame, or otherwise associating the form of the data 312 with each of the frames of the received video segment 310 to yield a marked video segment 322.

In conjunction with marking the video segment 310, the control server 304 may validate the identification data 312. For example, the identification data 312 may be compared against a database of other identification data associated with sources of previously submitted video segments that have been proven or at least considered reliable in the past. In another implementation, the identification data 312 may be compared against known databases to determine a user associated with the identification data 312. The control server 304 or other entity associated with the authentication node 300 may then attempt to contact the user independently to verify that the user was responsible for submission of the video segment 310 to the authentication node 300.

Returning to FIG. 5, in response to marking the video segment 310, the authentication node 300, by way of the control server 304, may transmit access information 316 over the communication network 330 for accessing the resulting marked video segment 322 (operation 514). In one example, the control server 304 transfers the access information 316 to the source device 350 to inform the source device 350 how the marked video segment 322 may be accessed. In other implementations, the control server 304 may transfer the access information 316 to one or more third parties over the communication network 330. The access information 316 may be embodied in a short message service (SMS) or text message, an e-mail message, an audio message, or other message of another format.

The access information 316 may take any of a number of forms as well. For example, the access information 316 may be a uniform resource locator (URL) for a website hosting the marked video segment 322. Further, the URL may be a hypertext link embedded within a text or e-mail message, thus promoting quick access to the marked video segment 322. In another implementation, the access information 316 may be a file name for the marked video segment 322, which may be accessed by way of a file transfer protocol (FTP) site or other type of website. Other types of access information 316 that relay information needed to access the marked video segment 322 are also possible. In addition, the access information 316 may include information distinguishing the marked video segment 322 from other video segments that may be available concurrently on the video server 302.

In response to receiving the access information 316 (operation 516), the source device 350 may forward the access information 316 to a third party (operation 518), such as a destination device 360 coupled to the communication network 330 by way of a network connection 361. For example, a user of the source device 350 may issue an e-mail or text message which includes the access information 316 to the destination device 360. In one implementation, the destination device 360 may be a server operated or employed by a news organization, wherein the destination device 360 is configured to accept and process such a message. In another example, the destination device 360 may be a web server hosting a web page that is accessible by the source device 350. In that case, the user may access the web page and transmit or manually enter the access information 316 into the website. Other methods of transferring the access information 316 to the destination device 360 may be utilized in other embodiments.

In response to receiving the access information 316 (operation 520), the destination device 360 may send a request 320 for the marked video segment 322 over the communication network 330 to the authentication node 300 (operation 522). The request 320 may include the access information 316, or may at least be based on the access information 316. As discussed above with respect to other aspects of the authentication node 300, the request 320 may take the form of a message, such as a text or e-mail message, a file transfer, such as an FTP transfer, or an access to a website.

In response to receiving and processing the request 320 (operation 524), the control server 304 of the authentication node 300 may transmit the requested marked video segment 322 over the communication network 330 to the requesting device (i.e., the destination device 360) (operation 526). Upon receiving the marked video segment 322 (operation 528), the destination device 360 may then process or display the marked video segment as desired. For example, presuming the destination device 360 is associated with a news service, such as a national news network or a local television station, the organization may broadcast the marked video segment 322 as part of a news feature. In another embodiment in which the destination device 360 is a web-based news, information, or video service, the destination device 360 may make the marked video segment 322 available for viewing by way of a website hosted on the destination device 360 or another device associated with the service.

The authentication node 300 may itself allow wide access to the marked video segment 322 from the video server 302 from any number of communication devices, such as the destination device 360. To that end, the authentication node 300 may publish the access information 316 on a website, or may merely provide a hypertext link on a website home page that is easily found and accessed by visitors to the web site.

Various embodiments as described above facilitate authentication of a source device of a transmitted video segment. Such authentication may at least allow the source device of the video segment, as well as a user associated with the source device, to be determined, and possibly investigated, regardless of how many times the marked video segment has changed hands since the original transmission of the video segment. In addition, the incorporation of sequence data associated with the marked video segment may allow the detection of tampering of the marked video segment, such as the removal of frames, or the addition of frames not included in the original video segment. Encoding of the identification data and/or the sequence data may add further protection against tampering as well. In addition, use of the embodiments discussed herein are particularly suited for use with sources that are small video-capable devices that incorporate little or no video editing capability, thus lending further credence to the authenticity of the video segment.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for authenticating a source device transmitting a video segment, the method comprising:
    receiving the video segment from the source device over a communication network, wherein the video segment comprises frames;
    receiving identification data indicating the source device over the communication network;
    marking at least one of the frames of the video segment with a form of the identification data, wherein marking the at least one of the frames comprises incorporating the identification data into video data representing the image for each of the at least one of the frames;
    transmitting access information over the communication network for accessing the marked video segment;
    receiving a request for the marked video segment from a communication device over the communication network, wherein the request is based on the access information; and
    in response to receiving the request, transmitting the marked video segment over the communication network to the communication device.

2. The method of claim 1, wherein transmitting the access information comprises transmitting the access information to at least one of the communication device and the source device.

3. The method of claim 1, wherein transmitting the access information comprises transmitting at least one of a short message service message comprising the access information and an electronic mail message comprising the access information.

4. The method of claim 1, wherein the access information comprises at least one of a uniform resource locator associated with the video segment and a file name associated with the video segment.

5. The method of claim 1, wherein the identification data comprises at least one of a phone number of the source device, a phone number associated with the source device, and a serial number of the source device.

6. The method of claim 1, further comprising, after the identification data has been incorporated into the video data, displaying the image for each of the at least one of the frames, wherein each image contains a representation of the identification data.

7. The method of claim 1, wherein marking the at least one of the frames of the video segment with a form of the identification data further comprises incorporating a translated version of the identification data into metadata of the at least one of the frames of the video segment.

8. The method of claim 1, further comprising marking the at least one of the frames of the video segment with sequence data indicating an order of the frames.

9. A non-transitory computer-readable medium comprising instructions executable on a processor for performing a method for authenticating a source device transmitting a video segment, the method comprising:

receiving the video segment from the source device over a communication network, wherein the video segment comprises frames;

receiving identification data indicating the source device over the communication network;

marking at least one of the frames of the video segment with a form of the identification data, wherein marking the at least one of the frames comprises incorporating the identification data into video data representing the image for each of the at least one of the frames;

transmitting access information over the communication network for accessing the marked video segment;

receiving a request for the marked video segment from a communication device over the communication network, wherein the request is based on the access information; and in response to receiving the request, transmitting the marked video segment over the communication network to the communication device.

10. A communication node, comprising:

a storage device configured to receive and store a video segment transmitted from a source device over a communication network, wherein the video segment comprises frames; and control logic coupled with the storage device and configured to receive identification data for the source device over the communication network, to mark at least one of the frames of the video segment in the storage device with a form of the identification data, wherein the control logic is configured to mark the at least one of the frames by incorporating the identification data into video data representing the image for each of the at least one of the frames, to transmit access information over the communication network for accessing the marked video segment, and to receive a request for the marked video segment from a communication device over the communication network, wherein the request is based on the access information; and the storage device further configured to transmit the marked video segment over the communication network to the communication device in response to the request.

11. The communication node of claim 10, wherein the control logic is configured to direct the storage device to receive the video segment from the source device.

12. The communication node of claim 10, wherein the control logic is configured to direct the storage device to transmit the marked video segment over the communication network to the communication device in response to the request.

13. The communication node of claim 10, wherein the control logic is configured to transmit the access information to at least one of the communication device and the source device.

14. The communication node of claim 10, wherein the control logic is configured to transmit at least one of a short message service message comprising the access information and an electronic mail message comprising the access information.

15. The communication node of claim 10, wherein the access information comprises at least one of a uniform resource locator associated with the video segment and a file name associated with the video segment.

16. The communication node of claim 10, wherein the identification data comprises at least one of a phone number of the source device, a phone number associated with the source device, and a serial number of the source device.

17. The communication node of claim 10, wherein after receiving the marked video segment, the communication device displays the image for each of the at least one of the frames, wherein each image contains a representation of the identification data.

18. The communication node of claim 10, wherein the control logic is further configured to mark the at least one of the frames of the video segment with a form of the identification data by incorporating a translated version of the identification into metadata of the at least one of the frames of the video segment in the storage device.

19. The communication node of claim 10, wherein the control logic is configured to mark the at least one of the frames of the video segment in the storage device with sequence data indicating an order of the frames.

20. The communication node of claim 10, wherein the source device comprises one of a cell phone, a personal digital assistant, a camera, and a camcorder.

* * * * *